United States Patent
Johnson

(10) Patent No.: US 6,341,248 B1
(45) Date of Patent: Jan. 22, 2002

(54) APPARATUS, METHODS, AND COMPUTER PROGRAM PRODUCTS FOR MONITORING THE ATTITUDE OF AN AIRCRAFT

(75) Inventor: Steven C. Johnson, Issaquah, WA (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 09/602,611

(22) Filed: Jun. 22, 2000

Related U.S. Application Data
(60) Provisional application No. 60/140,511, filed on Jun. 22, 1999.

(51) Int. Cl.$^7$ ............................................. G06G 7/78
(52) U.S. Cl. ..................... 701/4; 244/75 R; 244/175; 340/967
(58) Field of Search .......................... 701/4; 340/967; 244/75 R, 175, 180, 181; 73/178 R

(56) References Cited

U.S. PATENT DOCUMENTS

| | | | | |
|---|---|---|---|---|
| 3,970,829 A | * | 7/1976 | Melvin | 701/6 |
| 4,305,057 A | * | 12/1981 | Rolston | 340/974 |
| 4,343,035 A | * | 8/1982 | Tanner | 701/220 |
| 4,725,811 A | * | 2/1988 | Muller et al. | 340/968 |
| 5,001,646 A | * | 3/1991 | Caldwell et al. | 701/7 |

* cited by examiner

Primary Examiner—William A. Cuchlinski, Jr.
Assistant Examiner—Olga Hernandez

(57) ABSTRACT

An apparatus, methods, and computer program products are provided for monitoring the attitude of an aircraft. The apparatus of the present invention includes a navigation system, such as a GPS, that provide values representing the velocity vector of the aircraft. Additionally, the apparatus includes two gyroscopes positioned with respect to the aircraft to sense the roll and pitch of the aircraft. A generator is connected to the navigation system and generates a calculated flight path and roll angle based on the velocity vector of the aircraft. Further, the apparatus of the present invention includes a combiner connected to both the generator and the gyroscopes. The combiner combines the calculated flight path angle to the sensed pitch angle and the calculated roll angle to the sensed roll angle and generates composite flight path and roll angles. The composite flight path and roll angles represent the attitude of the aircraft. In some embodiments, the apparatus combines either the composite flight angle or the composite roll angle with either the pitch or roll values generated by the aircraft's attitude indicator. If the difference between these corresponding values exceed a threshold, the apparatus provides an indication to the pilot that the aircraft's attitude indicator is malfunctioning. In another embodiment, the apparatus may compare the composite flight path and roll angle values to corresponding threshold values. If the composite path and roll angle values exceed these thresholds, the apparatus provides an indication to the pilot that the aircraft is at an unsafe attitude.

62 Claims, 10 Drawing Sheets

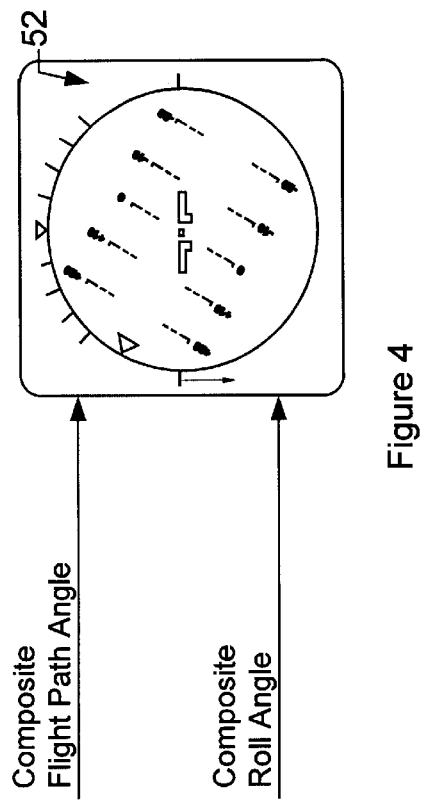
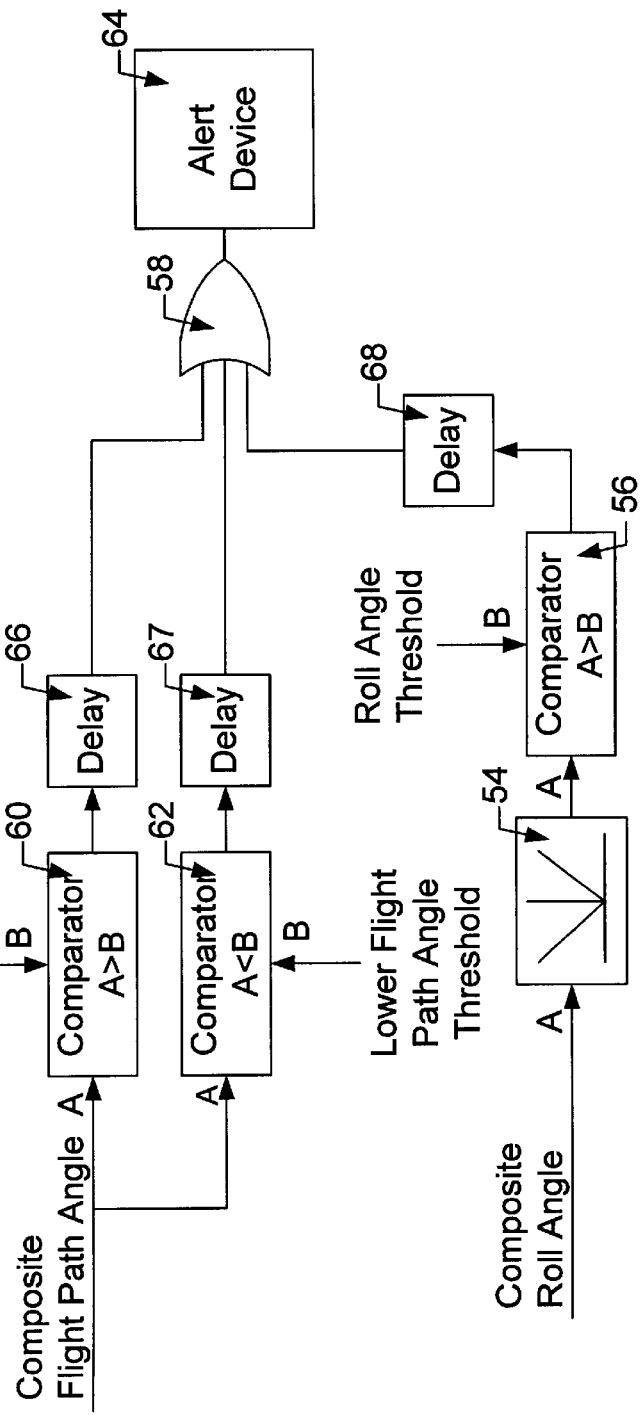
Figure 4
Figure 5

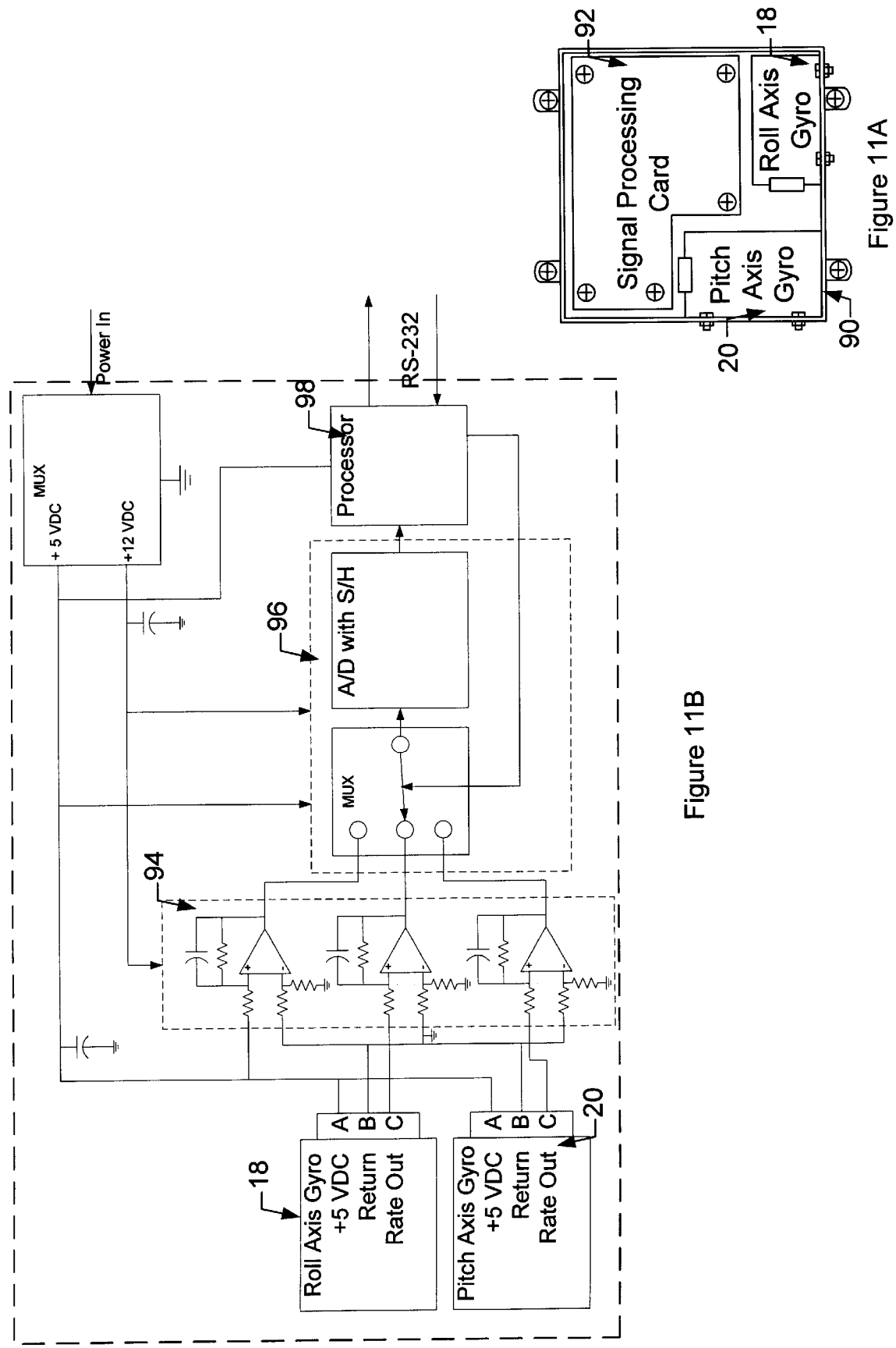

APPARATUS, METHODS, AND COMPUTER PROGRAM PRODUCTS FOR MONITORING THE ATTITUDE OF AN AIRCRAFT

CROSS-REFERENCE TO RELATED APPLICATIONS

The present application claims priority from U.S. Provisional Patent Application Serial No. 60/140,511 entitled: LOW COST MONITORING ATTITUDE SYSTEM FOR GENERAL AVIATION AIRCRAFT filed on Jun. 22, 1999, the contents of which are incorporated herein by reference.

FIELD OF THE INVENTION

The present invention relates generally to systems and methods for monitoring the flight parameters of an aircraft and, more particularly, to apparatus, methods, and computer program products for monitoring the attitude of an aircraft in order, for example, to provide an alternative indication to the pilot of an aircraft's attitude in a cost effective manner.

BACKGROUND OF THE INVENTION

An important, concern in the aircraft industry is ensuring flight safety. In light of this, many advancements have been made in the past few years to provide pilots and flight crew of aircraft with increased awareness concerning aircraft performance, flight parameters, and proximity of terrain and obstacles to the aircraft. For example, many of today's commercial and military grade aircraft include extensive instrumentation for providing the pilot and flight crew with a wide range of information concerning performance and flight parameters of the aircraft. Additionally, ground proximity warning systems, (also known as terrain awareness systems), have been developed, which analyze the flight parameters of the aircraft and the terrain surrounding the aircraft. Based on this analysis, these warning systems provide alerts to the flight crew concerning possible inadvertent collisions of the aircraft with surrounding terrain or other obstacles.

Providing flight safety systems for general aviation aircraft, however, has been somewhat problematic. Although flight safety is important, the cost and size of flight safety instrumentation and systems make these systems less feasible for smaller, less costly general aviation aircraft. As such, many of today's general aviation aircraft include less sophisticated instruments, and provide less information to the pilot and flight crew concerning aircraft operation and flight parameters than commercial and military grade aircraft. To remedy some of these problems, a ground proximity warning system has been developed by the Assignee of the present application for use in general aviation aircraft. This ground proximity warning system uses less inputs than ground proximity warning systems used in commercial and military grade aircraft to thereby accommodate for the reduced number of instruments available in the general aviation aircraft. This ground proximity warning system is described in U.S. patent application Ser. No. 09/534,222, entitled "Ground Proximity Warning System And Method Having A Reduced Set Of Input Parameters" filed on Mar. 24, 2000.

Despite the introduction of a ground proximity warning system for use in general aviation aircraft, there still remains a need for additional safety systems to provide the pilot and flight crew of general aviation aircraft with increased awareness concerning the flight operation and parameters of the aircraft. For example, many general aviation aircraft typically include an attitude indicator device, (also known as an artificial horizon). The attitude indicator provides both pitch and bank angle of the aircraft relative to Earth. For example, FIG. 1 illustrates a typical attitude indicator. The attitude indicator of FIG. 1 indicates that the aircraft associated with the attitude indicator is in a climbing turn.

Knowledge of the aircraft attitude with reference to Earth is very important for flight safety. Specifically, when the aircraft is flown either in inclement weather conditions, such as rain or fog, or at night, the pilot and flight crew cannot reference the plane's orientation with the earth's surface based on the ground below or the natural horizon. In these instances, the pilot and flight crew generally rely on the attitude indications provided by the attitude indicator for safe navigation. As such, it is important that the attitude indicator provide an accurate indication of the attitude of the aircraft, so that the aircraft may be safely flown in inclement weather conditions or at night.

However, there may be some accuracy problems associated with attitude indicators used in many aircraft. Specifically, attitude indicators are typically gyroscopic devices that operate on a vacuum source, which powers and spins the gyroscope. As illustrated in FIG. 1, as the aircraft changes pitch and bank angle, the gyroscope remains positioned level with the earth's surface, thereby indicating the aircraft's orientation relative to earth. Problems may occur when the vacuum pump either malfunctions or fails. In this instance, the attitude indicator will not accurately reflect the attitude of the aircraft. Even more problematic is the fact that this is typically not an abrupt event, but instead, the vacuum system typically fails in a gradual manner. As such, there may be a time frame in which the attitude indicator is providing erroneous indications, but not noticeably incorrect readings. Thus, if the pilot does not cross-check the attitude indicator against other cockpit instruments, he or she may make control inputs based on this erroneous information and position the aircraft in an unsafe attitude.

The problems associated with attitude indicator failure are generally not a major concern for commercial and military grade aircraft, as these aircraft include alternative sources of attitude information. For example, many of these aircraft include systems such as inertial navigation systems (INS). The INS includes three accelerometers mounted perpendicular to each other and three rate gyroscopes that measure the rate of movement of the aircraft about the pitch, roll, and yaw axes. The INS is often used in the aircraft auto-pilot systems to maintain the aircraft in a safe attitude. The INS can also be used by the pilot and flight crew as an alternative or back-up system to the attitude indicator.

Additionally, attitude systems have been developed using global positioning systems (GPS). These attitude systems include three GPS antennas that are located at different positions on the body of the aircraft. Each of the GPS antennas provides a position of the aircraft corresponding to the position of the body of the aircraft to which the GPS antenna is attached. By comparing the positions output by each of the GPS antennas, the pitch, roll, and yaw of the aircraft can be determined.

Although these INS and GPS based attitude systems provide alternative or back-up systems for monitoring the attitude of an aircraft, these systems may not be feasible for use in some aircraft. Specifically, these systems are typically expensive, are of significant size and weight, and require ancillary equipment to support these systems. As such, a system for monitoring and providing an alternative indication of the attitude of the aircraft to the pilot and flight crew that is more cost effective, reduced in size and weight, and requires less ancillary equipment is needed for use in general aviation aircraft, as well as other types of aircraft.

SUMMARY OF THE INVENTION

As set forth below, the present invention provides apparatus, methods, and computer program products for monitoring the attitude of an aircraft. Importantly, the apparatus, methods, and computer program products of the present invention use the velocity vector generated by a single GPS antenna and the sensed roll and pitch angles of the aircraft generated by a pair of low cost gyroscopes to provide an indication of the attitude of the aircraft. By using a single GPS antenna and a pair of low cost gyroscopes, the apparatus, methods, and computer program products of the present invention provide a low cost alternative aircraft attitude indicator that can be used either in place of or in conjunction with the traditional attitude indicator of the aircraft.

Accordingly, in one embodiment, the present invention includes an apparatus for monitoring the attitude of an aircraft. The apparatus includes both an input for receiving velocity values related to the velocity vector of the aircraft and an output for providing a composite roll and flight path angle of the aircraft. Connected to the input is a generator for determining a calculated flight path angle and a calculated roll angle of the aircraft based on a velocity vector of the aircraft. Further, the apparatus of the present invention includes a first combiner in electrical communication with the generator for combining the calculated flight path angle from the generator with a sensed pitch angle of the aircraft and the calculated roll angle from the generator with a sensed roll angle of the aircraft.

In operation, the apparatus initially receives, via the input, velocity values representing the velocity vector of the aircraft. Based on these velocity vectors, the generator generates calculated flight path and roll angles. The first combiner receives the calculated flight path and roll angles and combines these values with corresponding sensed pitch and roll angles of the aircraft to thereby produce a composite flight path angle and a composite roll angle representing the attitude of the aircraft. These composite flight path and roll angels are provided to the output of the apparatus.

As detailed above, the first combiner of the present invention combines the calculated flight path and roll angles with sensed pitch and roll angles of the aircraft. In one embodiment, the apparatus of the present invention further includes first and second gyroscopes positioned with respect to the aircraft such that one of the gyroscopes senses the roll angle of the aircraft and the other senses the pitch angle of the aircraft. In operation, as the aircraft moves relative to the pitch and roll axes, the gyroscopes sense these movements and output sensed roll and pitch angles to the first combiner.

In some embodiments of the present invention, the first and second gyroscopes are rate gyroscopes having outputs that represent the rate of change in the roll and pitch of the aircraft. In this embodiment, to determine a sensed pitch and roll angle, the apparatus further includes first and second integrators connected respectively to the first and second gyroscopes. The first and second integrators integrate the respective outputs of the first and second gyroscopes to provide sensed roll and pitch angles of the aircraft to the first combiner.

As discussed above, the apparatus of the present invention includes both a GPS antenna and gyroscopes for determining the attitude of the aircraft. Use of both the GPS antenna and the gyroscopes is important in providing an accurate indication of the attitude of the aircraft. Specifically, GPS is typically an accurate and reliable system for providing positional information related to the aircraft. However, due to the need to calculate the flight path angle and the pitch from the velocity vector values generated by the GPS and the typically slower refresh rate of GPS, the attitude information provided by GPS may lag somewhat behind the actual movement of the aircraft.

Additionally, as stated, the generator generates a calculated roll angle based on the velocity vector of the aircraft and more particularly, based on the change in track of the aircraft over time. Specifically, if the aircraft has a roll angle other than 0°, then typically the track of the aircraft with respect to north will change over time. Thus, typically by monitoring the change in track over time, the roll of the aircraft is determinable. However, in some flight maneuvers, the aircraft may have a roll angle other than 0°, but the track of the aircraft does not change. For example, if an aircraft is landing in a cross-wind, many times the pilot will perform a "slide slip" maneuver, in which the aircraft is banked to counteract the cross-wind so that the aircraft will fly at a constant track. In this instance, the generator will generate a 0 value for the calculated roll angle because there is no change in track, even though the aircraft has a roll angle different from 0°.

In light of this, the gyroscopes are used to track and provide more frequent updates of the aircraft's movements to thereby supplement the output of the GPS. Further, in instances, in which the aircraft has a roll angle but is not changing track, the gyroscopes will sense the roll of the aircraft and provide the roll angle value. However, these gyroscopes are typically less accurate over time and may begin to drift. As such, in some embodiments, the output of the GPS is used to monitor the attitude of the aircraft for stable flight, while the gyroscopes are used for abrupt changes in the attitude of the aircraft.

In order to combine the signals from the GPS and the gyroscopes such that the calculated angle values of the GPS are used for stable flight and the angle values from the gyroscopes are used for abrupt changes, the first combiner, according to one embodiment of the present invention, further includes a complimentary filter connected to the output of the generator and the first and second gyroscopes. The complimentary filter operates as a low pass filter for the output of the generator and a high pass filter for the output of the first and second gyroscopes. As such, for stable flight, the calculated angle values from the generator and GPS dominate the composite flight path and roll angle values used for indicating the attitude of the aircraft, while during abrupt changes in the aircraft's orientation, the output of the gyroscopes dominate the composite flight path and roll angle values used for indicating the attitude of the aircraft.

As mentioned above, the generator generates a calculated flight path and roll angle based on the velocity vector of the aircraft. In one embodiment of the present invention, the apparatus further includes a navigation system connected to the input. The navigation system provides an indication of the velocity of the aircraft in a north ($V_n$), east ($V_e$), and vertical ($V_z$) direction. In this embodiment of the present invention, the generator determines a calculated flight path angle and a calculated roll angle of the aircraft based on the velocity of the aircraft in a north ($V_n$), east ($V_e$), and vertical ($V_z$) direction. For example, in one embodiment, the generator determines the calculated flight path angle and calculated roll angle of the aircraft based on the following equations:

$$\gamma = \tan^{-1} \frac{V_z}{\sqrt{V_n^2 + V_e^2}}$$

$$\psi = \tan^{-1} \frac{V_n}{V_e}$$

$$Roll_w = \tan^{-1} \frac{\frac{d\psi}{dt}\sqrt{V_n^2 + V_e^2}}{g}$$

where

γ=calculated flight path angle of the aircraft;
ψ=track angle of the aircraft;
$Roll_w$=calculated roll angle of the aircraft;
$V_n$=velocity of the aircraft in a north direction;
$V_e$=velocity of the aircraft in an east direction;
$V_z$=velocity of the aircraft in a vertical direction; and
g=gravity.

In addition to generating composite flight path and roll angles indicating the attitude of the aircraft, in some embodiments, the apparatus, methods, and computer program products of the present invention may also monitor the attitude of the aircraft and provide the pilot with alerts, either visual or aural, if the aircraft is oriented at an unsafe attitude. For example, in one embodiment of the present invention, the apparatus further includes a comparator connected to the output of the first combiner and an alert device connected to the comparator. In operation, the comparator compares the composite roll angle generated by the first combiner to a threshold roll angle. If the composite roll angle is at least as great as the threshold roll angle, the alert device will provide an alert to the pilot that the aircraft is in an unsafe roll or bank angle orientation. In some embodiments, the apparatus further includes a display connected to the output comparator that displays the composite flight path angle and composite roll angle indicating the attitude of the aircraft.

In addition to providing alerts concerning an excessive bank angle, the apparatus, methods, and computer program products of the present invention also monitor the flight path angle of the aircraft. For example, in one embodiment of the present invention, the comparator connected to the output of the first combiner compares the composite flight path angle generated by the first combiner to upper and lower threshold flight path angles. If the composite flight path angle is at least great as the upper threshold flight path angle or no more than the lower flight path angle, the alert device will generate an indication to the pilot of the aircraft. Further, in some embodiments, the display may display the composite flight path angle and composite roll angle indicating the attitude of the aircraft.

As discussed previously, the traditional attitude indicator used in most aircraft may experience either an abrupt or gradual failure that may cause the pilot to place the aircraft in an unsafe attitude. In light of this, in some applications, it is advantageous to use the apparatus, methods, and computer program products of the present invention as a redundant system so that failures in the traditional attitude indicator can be recognized by the pilot. For example, in one embodiment of the present invention, the apparatus further includes a second combiner connected to the output of the first combiner. The second combiner is also connected to an output of a traditional attitude indicator associated with the aircraft. The apparatus of this embodiment also includes a comparator connected to the output of the second combiner.

In operation, the second combiner combines the composite roll angle from the first combiner with an indicated roll angle provided by the attitude indicator associated with the aircraft and generates a difference signal. The comparator of this embodiment, in turn, compares the difference signal to a difference angle threshold value. If the difference signal is at least as great as the difference angle threshold value, the alert device generates an indication to the pilot notifying the pilot that the attitude indicator associated with the aircraft may be incorrect. As such, the pilot will not use the traditional attitude indicator, but instead, will rely on the composite flight path and roll angle output by the apparatus, methods, and computer program products of the present invention.

Importantly, as mentioned above, the apparatus, methods, and computer program products of the present invention use values from a single GPS antenna and two low cost rate gyroscopes to provide an indication of the attitude of the aircraft. As a single GPS antenna and low cost gyroscopes are much more cost effective, smaller in size and weight, and require less ancillary equipment than either multiple GPS antennas of INS systems, the apparatus, methods, and computer program products of the present invention provide a feasible attitude monitoring system for use in aircraft, and especially in general aviation aircraft where cost, size, and weight are significant factors.

BRIEF DESCRIPTION OF THE DRAWINGS

FIG. 4 is a block diagram of an apparatus for displaying the composite flight path and roll angle values defining the attitude of an aircraft according to one embodiment of the present invention.

FIG. 5 is a block diagram of an apparatus for monitoring the attitude of an aircraft based on the composite flight path and roll angle values and providing alerts if the aircraft has an unsafe attitude according to one embodiment of the present invention.

FIG. 11A is a top view of a packaging system for containing the gyroscopes and electronics according to one embodiment of the present invention.

FIG. 11B is schematic view of a signal processing circuit card for interfacing with gyroscopes according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As mentioned above and discussed in more detail below, the apparatus, methods, and computer program products of the present invention, provide an alternative system for monitoring the attitude of an aircraft. Specifically, in one embodiment, the apparatus, methods, and computer program products of the present invention use a single GPS antenna and two low cost gyroscopes. Based on the output of these devices, the apparatus, methods, and computer program products of the present invention provide composite flight path and roll angle values that define the attitude of the aircraft. These composite angle values are then compared to threshold values that define unsafe attitudes for the aircraft. If one of the evaluated composite angles exceeds the threshold angle values, an indication is provided either aurally or visually to the pilot. Further, the composite flight path and roll angles of the aircraft may be displayed to the user to indicate the attitude of the aircraft.

Additionally, in some embodiments, the composite roll angle of the aircraft may be compared to the sensed roll angle indicated by an attitude indicator associated with the aircraft. If the difference between the composite roll angle provided by the apparatus, methods, and computer program products of the present invention and the sensed roll angle provided by the aircraft's attitude indicator exceeds a difference threshold value, the pilot of the aircraft will be alerted that the aircraft's attitude indicator may be malfunctioning.

Figure 2:
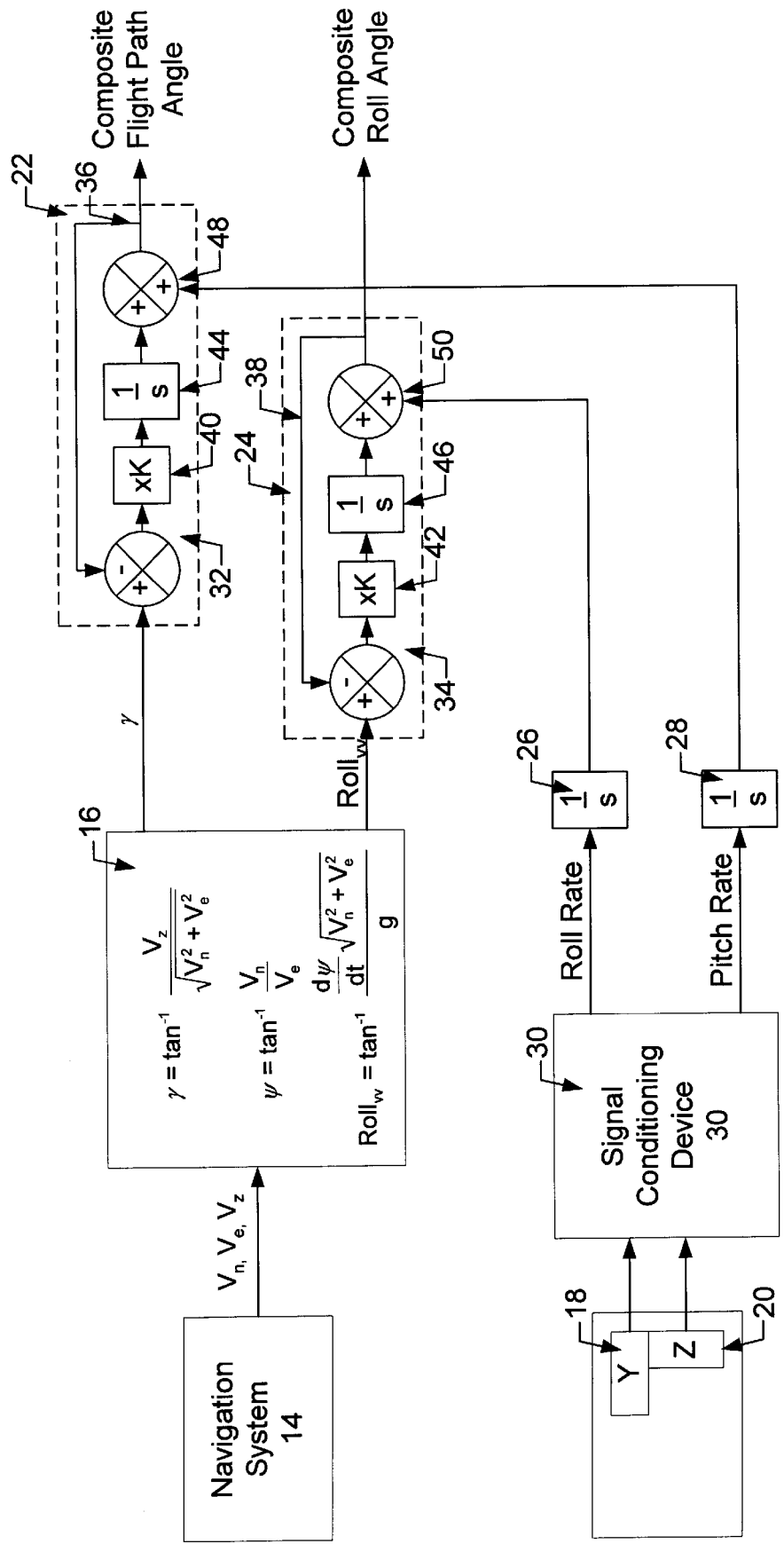
FIG. 2 is a block diagram of an apparatus for determining composite flight path and roll angle values defining the attitude of an aircraft according to one embodiment of the present invention.

With reference to FIG. 2, an apparatus for monitoring the attitude of an aircraft according to one embodiment is illustrated. The apparatus 12 of this embodiment includes a navigation system 14, such as a GPS or INS system, that provide values representing the velocity vector of the aircraft. Connected to the navigation system is a generator 16 that receives the values of the velocity vector and generates a calculated flight path angle γ and a calculated roll angle Roll$_{vv}$ of the aircraft based on the velocity vector of the aircraft.

The apparatus of the present invention also includes first and second gyroscopes, 18 and 20, respectively, positioned with respect to the aircraft. Specifically, the first gyroscope is positioned in a plane that is parallel to an axis extending lengthwise with respect to the body of the aircraft and the second gyroscope is positioned in a plane that is perpendicular to the an axis extending lengthwise with respect to the body of the aircraft. In this configuration, the first gyroscope senses the roll of the aircraft, while the second gyroscope senses the pitch of the aircraft.

Connected to the output of both the generator and the first and second gyroscopes is a first set of combiners, 22 and 24. One combiner 22 is configured to receive the calculated flight path angle γ generated by the generator and the sensed pitch angle from the second gyroscope 20, while the other combiner 24 is configured to receive the calculated roll angle Roll$_{vv}$ generated by the generator and the sensed roll angle from the first gyroscope 18.

Figure 3:
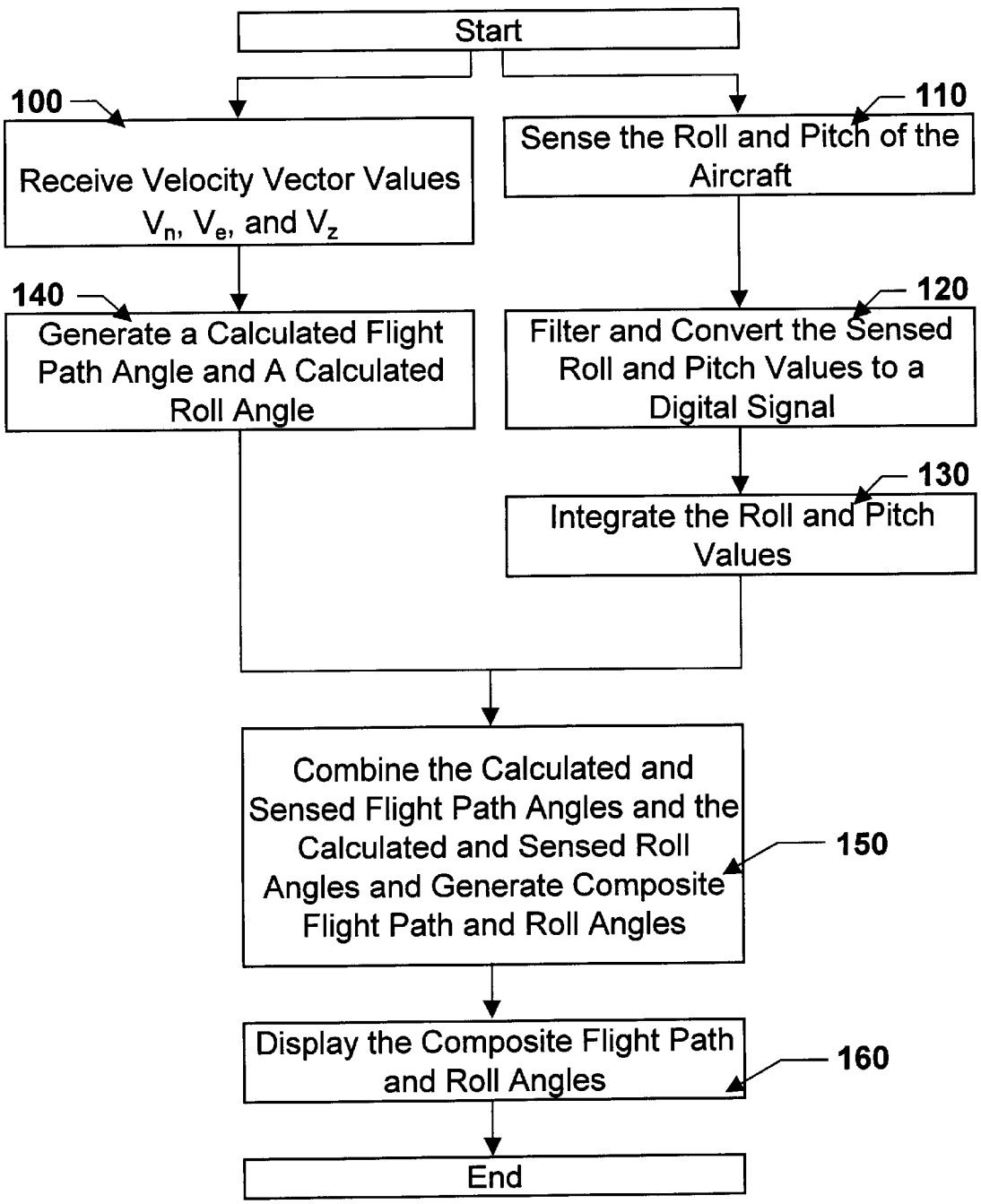
FIG. 3 is a block diagram of the operations performed to determine composite flight path and roll angle values defining the attitude of an aircraft according to one embodiment of the present invention.

With reference to FIG. 3, in operation, to determine the attitude of the aircraft, the navigation system provides values representing the velocity vector of the aircraft to the generator. (See step 100). Likewise, the first and second gyroscopes also provide sensed values representing the roll and pitch of the aircraft. (See step 110). The generator generates a calculated flight path angle γ and a calculated roll angle Roll$_{vv}$ based on the velocity vector of the aircraft. (See step 140). Further, the combiner 22 combines the calculated flight path angle and the sensed pitch angle to form a composite flight path angle, and the combiner 24 combines the calculated roll angle and the sensed roll angle to form a composite roll angle value. (See step 150). The composite flight path and roll angles define the attitude of the aircraft. As discussed in detail below, the composite flight path angle and the composite roll angle can be used to alert the pilot and crew of the aircraft if the aircraft has an unsafe attitude, as a back-up system for displaying the attitude of the aircraft, and/or as a system for monitoring the performance of the aircraft's attitude indicator.

In the above embodiment, the generator 16 of the present invention generates a calculated flight path and roll angle based on the velocity vector provided by the navigation system 14. (See step 140). These values are typically provided in terms of the components of the velocity of the aircraft in the north (V$_n$), east (V$_e$), and vertical (V$_z$) direction. In this embodiment of the present invention, the generator generates the calculated flight path and roll angle based on the components of the velocity vector. Specifically, the calculated roll angle Roll$_{vv}$ is determined based on the change in track of the aircraft over time. The track of the aircraft is defined as the angle that the aircraft makes with respect to the true north or 0°. The track ψ angle of the aircraft is determined by the following equation:

$$\psi = \tan^{-1} \frac{V_n}{V_e}$$

where ψ=track angle of the aircraft, V$_n$=velocity of the aircraft in a north direction, and V$_e$=velocity of the aircraft in an east direction.

As stated, the roll angle of the aircraft can be determined based on the change in track of the aircraft over time. Specifically, if the aircraft has a roll angle other than 0°, the track of the aircraft with respect to north will change over time. Thus, by monitoring the change in track over time, the roll of the aircraft is determinable. As such, in one embodiment, the generator determines a calculated roll angle for the aircraft based on the following equation:

$$Roll_w = \tan^{-1}\frac{\frac{d\psi}{dt}\sqrt{V_n^2 + V_e^2}}{g}$$

where $\psi$=track angle of the aircraft, $Roll_w$=calculated roll angle of the aircraft, $V_n$=velocity of the aircraft in a north direction, $V_e$=velocity of the aircraft in an east direction, $V_z$=velocity of the aircraft in a vertical direction, and g=gravity.

The flight path angle γ of an aircraft is related to an angle at which the aircraft is travelling with respect to a plane that is tangent to a point on the Earth's surface. This angle is also determined based on the velocity vector of the aircraft using the following equation:

$$\gamma = \tan^{-1}\frac{V_z}{\sqrt{V_n^2 + V_e^2}}$$

where γ=calculated flight path angle of the aircraft, $V_n$=velocity of the aircraft in a north direction, $V_e$=velocity of the aircraft in an east direction, and $V_z$=velocity of the aircraft in a vertical direction.

As illustrated in FIG. 2, the apparatus of the present invention uses gyroscopes to sense the roll and pitch of the aircraft. In some embodiments of the present invention, the first and second gyroscopes, 18 and 20, respectively, are rate gyroscopes that generate a rate of change in the pitch and roll of the aircraft. In this embodiment, the apparatus further comprises first and second integrators, 26 and 28, respectively connected to the first and second gyroscopes, 18 and 20. Additionally, the apparatus may include a signal conditioning device 30 for filtering the sensed signals output by the gyroscopes and converting the sensed signals into digital signals.

With reference to FIG. 3, in this embodiment, when the gyroscopes generate sensed signals representing the roll and pitch of the aircraft, (see step 110), the signal conditioning device conditions the signals by filtering the signals and/or converting the signals from analog to digital. (See step 120). Further, the first and second integrators receive the signals from the first and second gyroscopes representing a rate of change in roll and pitch of the aircraft and respectively integrate the signals to thereby provide sensed roll and pitch angles of the aircraft. (See step 130). These roll and pitch angle values are then provided to the combiners, 22 and 24, to be combined with the calculated flight path and roll angle values. (See step 150).

As discussed above, the apparatus of the present invention includes both a navigation system and gyroscopes for determining the attitude of the aircraft. Use of both the navigation system and the gyroscopes is important in providing an accurate indication of the attitude of the aircraft. Specifically, navigation systems, such as GPS, are typically an accurate and reliable system for providing positional information related to the aircraft. However, due to the need to calculate the flight path angle and the pitch from the velocity vector values generated by the navigation system and the typically slower refresh rate of the navigation system, the attitude information provided by navigation system may lag somewhat behind the actual movement of the aircraft. For example, in an embodiment in which the navigation system is GPS, the attitude determined based on GPS may lag by the actual attitude of the aircraft by as much as five seconds.

Additionally, as stated, the generator generates a calculated roll angle based on the velocity vector of the aircraft and more particularly, based on the change in track of the aircraft over time. Specifically, if the aircraft has a roll angle other than 0°, then typically the track of the aircraft with respect to north will change over time. Thus, typically by monitoring the change in track over time, the roll of the aircraft is determinable. However, in some flight maneuvers, the aircraft may have a roll angle other than 0°, but the track of the aircraft does not change. For example, if an aircraft is landing in a cross-wind, many times the pilot will perform a "slide slip" maneuver, in which the aircraft is banked to counteract the cross-wind so that the aircraft will fly at a constant track. In this instance, the generator will generate a 0 value for the calculated roll angle because there is no change in track, even though the aircraft has a roll angle different from 0°.

To remedy this problem, the gyroscopes, 18 and 20, are used to provide more frequent updates of the aircraft's movements to thereby supplement the output of the navigation system. Further, in instances, in which the aircraft has a roll angle but is not changing track, the gyroscopes will sense the roll of the aircraft and provide the roll angle value. However, these gyroscopes also have associated drawbacks. Specifically, these low cost gyroscopes are typically less accurate over time and may begin to drift. For example, typical low cost gyroscopes that are implemented in the present invention may have drift rates in the area of 100–120°/hour.

In light of the problems with low refresh rate for GPS and the drift characteristics of the gyroscopes, the apparatus, methods, and computer program products of the present invention use the output of the navigation system to monitor the attitude of the aircraft for stable flight and the gyroscopes for abrupt changes in the attitude of the aircraft.

With reference to FIG. 2, in order to combine the signals from the navigation system and the gyroscopes such that the angle values of the GPS are used for stable flight and the angle values from the gyroscopes are used for abrupt changes, the first set of combiners, 22 and 24, according to one embodiment of the present invention, further includes complimentary filters, 32 and 34, connected to output of the generator 16 and the first and second gyroscopes, 18 and 20. The complimentary filter has a set of feedback loops that operate as a low pass filter for the output of the generator and a high pass filter for the output of the first and second gyroscopes. As such, for stable flight, the angle values output by the navigation system dominate the composite flight path and roll angle values used for indicating the attitude of the aircraft, while during abrupt changes in the aircraft's orientation, the output of the gyroscopes dominate the composite flight path and roll angle values used for indicating the attitude of the aircraft.

In one embodiment, the complimentary filters include feedback loops, 36 and 38, respectively connected to summers, 48 and 50. Additionally, the complimentary filters respectively include elements, 40 and 42, that establish the time constants and lag devices, 44 and 46, providing a G(s) function for each feedback loop. As stated, the complimentary filters operate as a low pass filter for the output of the navigation system and generator and a high pass filter for the gyroscopes. For example, when the sensed pitch angle from the second gyroscope is 0°, the resultant of the complimentary filter 32 is:

$$(\text{input} - \text{output}) \times \tau$$

or $$\frac{1}{\tau(s+1)}$$

thereby providing a low pass filter. However, if the calculated flight path value γ is 0°, then the resultant of the complimentary filter 32 is:

$$(\text{input} - \text{output}) \times \tau$$

or $$\frac{\tau s}{(s+1)}$$

thereby providing a high pass filter.

The choice of the time constant K, (i.e., 1/π), is dependent upon the desired affect that the output of the gyroscopes will have on the composite flight path and roll angles. Specifically, the time constant K controls how quickly the errors in the gyroscopes are "washed out" by the calculated values provided by the generator. K is typically chosen to have a value of 1/60 seconds, but it must be understood that K can be chosen as any desired value.

As discussed above, the apparatus, methods, and computer program products of the present invention receive values representing the velocity vector of the aircraft from a navigation system. It must be understood that this could be any type of navigation system, including but not limited to a GPS or INS system.

Further, the generator of the present invention may consist of any number of devices. The generator may be a data processing device, such as a microprocessor or microcontroller or a central processing unit. The generator could be another logic device such as a DMA (Direct Memory Access) processor, an integrated communication processor device, a custom VLSI (Very Large Scale Integration) device, an ASIC (Application Specific Integrated Circuit) device or any other analog or digital circuitry designed to generate the calculated flight path and roll angles as described above.

Additionally, the apparatus, methods, and computer program products of the present invention use gyroscopes to sense the roll and pitch of the aircraft. Preferably, low cost, reduced size and weight gyroscopes are used. As discussed, although these gyroscopes typically have drift characteristics in the range of 100–120°/hour, this drift is compensated by the navigation system. Importantly, the gyroscopes should have higher refresh rates such that the attitude of the aircraft is updated more frequently. In one embodiment of the present invention, the apparatus of the present invention includes gyroscope manufactured by Systron Donner, Inertial Division located in Concord, Calif. Preferably gyroscopes having a model number of AQRS-0064-109 are used.

As illustrated, the apparatus, methods, and computer program products of the present invention provide composite flight path and roll angle values representing the attitude of the aircraft based on the velocity vector of the aircraft and a pair of low cost gyroscopes. The angle values output by the apparatus, methods, and computer program products of the present invention may be used in many ways to provide the pilot and flight crew of the aircraft with information concerning the attitude of the aircraft. For example, with reference to FIG. 4, in one embodiment of the present invention, the apparatus further includes a display 52 connected to the output of the first set of combiners, 22 and 24. With reference to FIG. 2, the display device may be configured to display the composite flight path and roll angles at all times or may be a selectable feature on the display. (See step 160). Additionally, the display may be either a dedicated display or an existing aircraft display, such as a weather radar, or moving map display.

In addition to providing a display of the attitude of the aircraft for use by the pilot and flight crew of the aircraft, the apparatus, methods, and computer program products of the present invention may also be used as an alerting system to provide the user with a visual or aural indication that the aircraft is in an unsafe attitude. For example, in one embodiment, the apparatus, methods, and computer program products of the present invention may alert the pilot and flight crew of the aircraft if it is determined that the aircraft is oriented at an unsafe bank angle or flight path angle.

The definition of an unsafe bank angle or flight path angle is typically based on the type of aircraft. For most general aviation aircraft, a bank angle equal to or exceeding 50° with reference to level flight may be considered unsafe. Further, a flight path angle that exceeds 30° above level flight or is less than −15° below level flight may be considered unsafe flight path angles.

With reference to FIG. 5, to monitor and provide alerts concerning the bank angle of the aircraft, the apparatus further includes a signal conditioning device 54 connected to the combiner 24. The apparatus also includes a comparator 56 connected to the signal conditioning device and an OR gate 58. To monitor the flight path angle, the apparatus includes two comparators, 60 and 62, connected to the combiner 22. The comparators, 60 and 62, are also connected to the OR gate 58. An alert device 64 is connected to the comparators, 56, 60, and 62.

Figure 6:
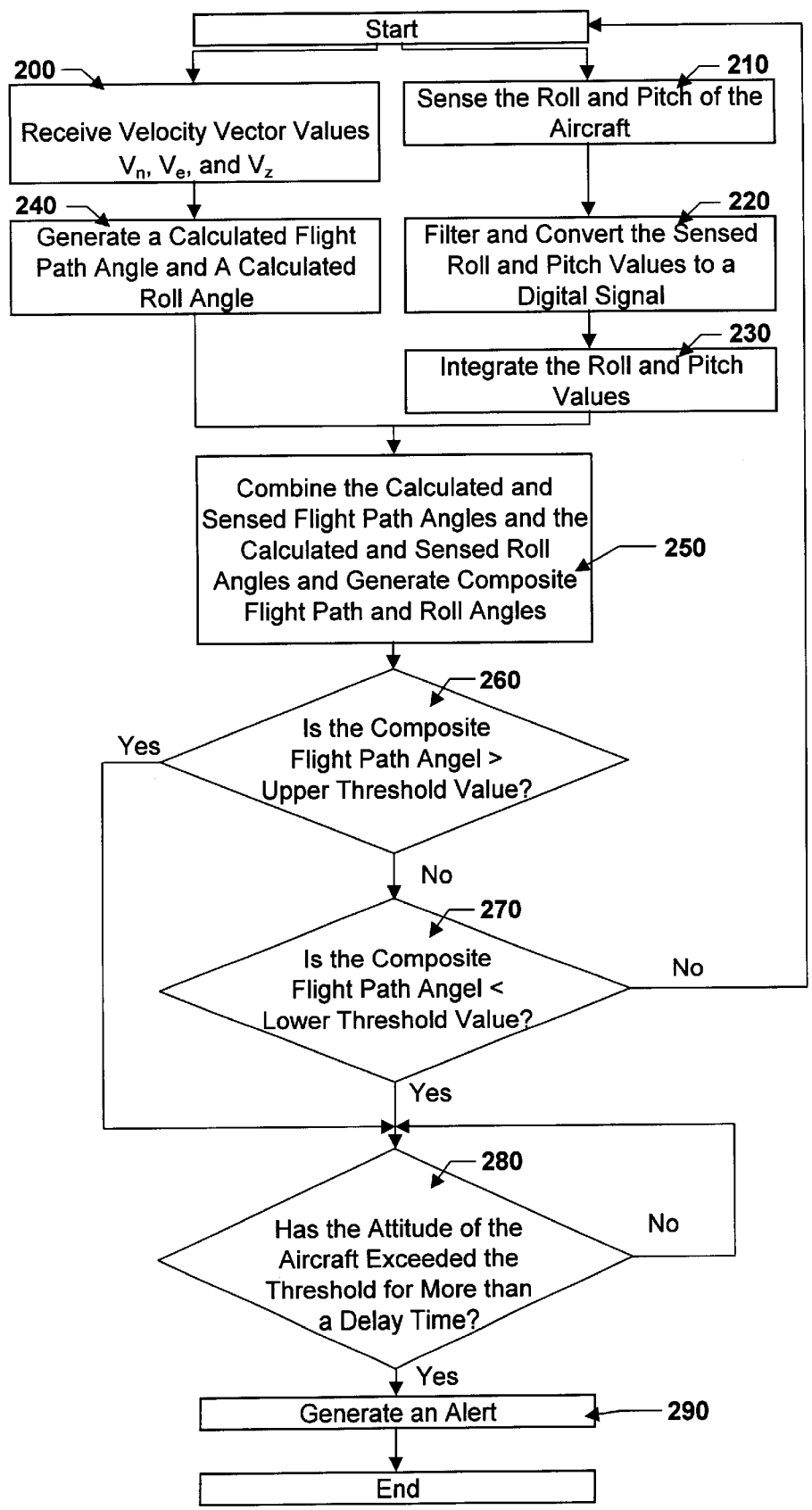
FIG. 6 is a block diagram of the operations performed to monitor the composite flight path angle value of an aircraft and providing alerts if the aircraft is in an unsafe flight path angle according to one embodiment of the present invention.
Figure 7:
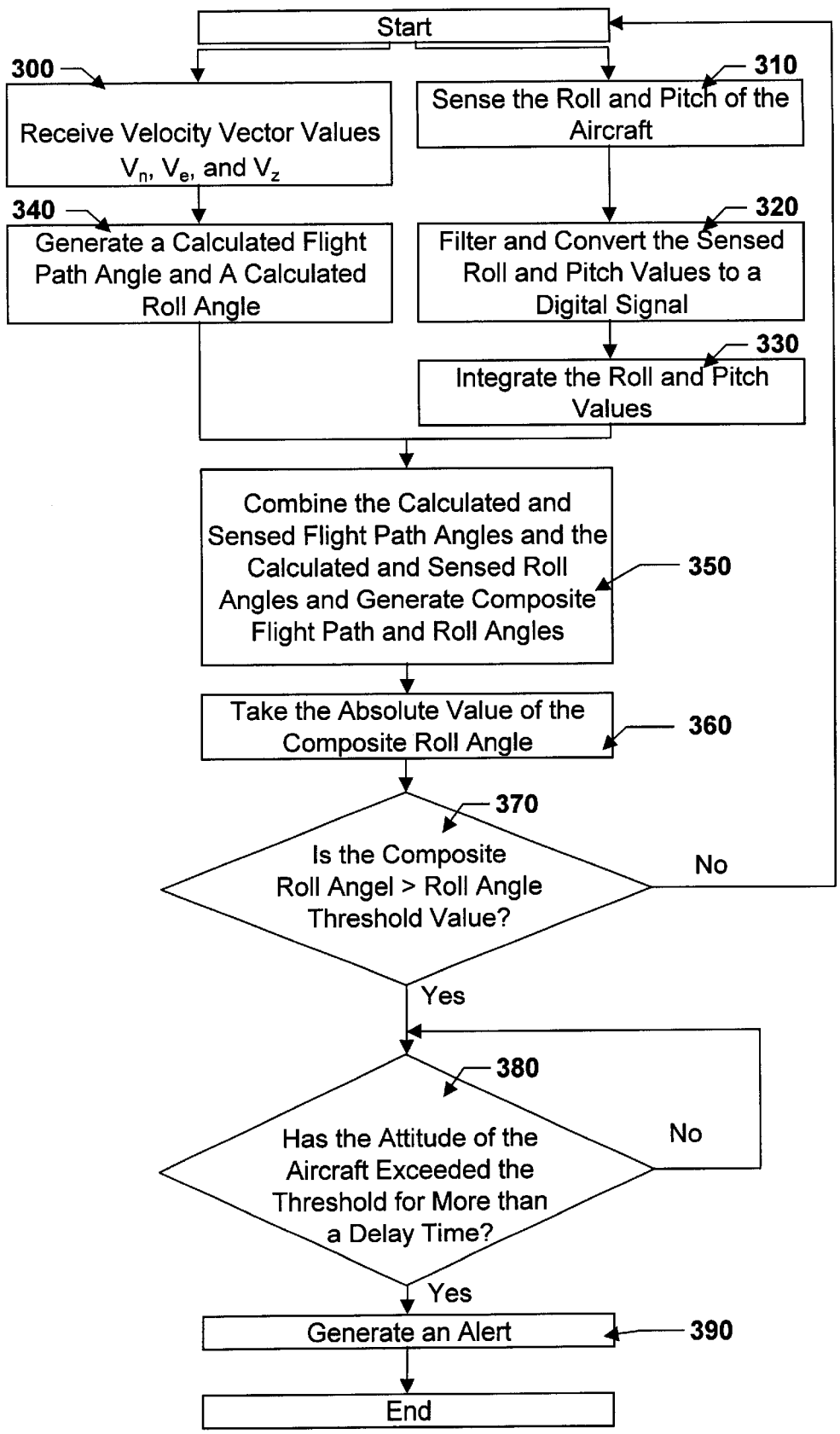
FIG. 7 is a block diagram of the operations performed to monitor the composite roll angle value of an aircraft and to provide alerts if the aircraft is in an unsafe roll angle according to one embodiment of the present invention.

FIG. 6 illustrates the operation for monitoring the flight path angle of the aircraft and FIG. 7 illustrates the operation for monitoring the roll angle of the aircraft. To monitor the bank and flight path angle of the aircraft, the navigation system provides values representing the velocity vector of the aircraft to the generator, (see steps 200 and 300), and the first and second gyroscopes also provide sensed values representing the roll and pitch of the aircraft. (See steps 210 and 310). The generator generates a calculated flight path angle and a calculated roll angle based on the velocity vector of the aircraft. (See steps 240 and 340). Further, the combiner 22 combines the calculated flight path angle and the sensed pitch angle to form a composite flight path angle, and the combiner 24 combines the calculated roll angle and the sensed roll angle to form a composite roll angle value. (See steps 250 and 350).

With reference to FIG. 6, the comparators, 60 and 62, receive the composite flight path angle value from the combiner 22. The comparator 60 compares the composite flight path angle to the upper flight path angle threshold, (see step 260), and the comparator 62 compares the composite flight path angle to the upper flight path angle threshold. (See step 270). Further, with reference to FIG. 7, the signal conditioning device receives the composite roll angle from the combiner 24 and takes the absolute value of the composite roll angle. (See step 360). The comparator 64 compares the composite roll angle to the roll angle threshold value. (See step 370). If either the composite flight path angle is greater than the upper flight angle threshold value or less than the lower flight angle threshold value, (see steps 260 and 270), or the composite roll angle is greater than the roll angle threshold value, (see step 370), a signal is provided to the alert device 64. (See steps 290 and 390).

Depending on the embodiment, the alert device may be one or several different types of alert devices. For example, in one embodiment, the alert device may be a speaker or a light that respectively provides either an aural or visual indication that the aircraft is at an unsafe attitude. For example, in one embodiment, if the composite roll angle is greater than the roll angle threshold value, the alert device may be a speaker that announces to the pilot the message "Bank Angle." Likewise, if the flight path angle is greater than upper flight path angle threshold, the alert device may announce "Flight Path High," or if the flight path angle is less than the lower flight path angle threshold, the alert device may announce "Flight Path Low." Similar announcements could be made using light displays that indicate the different alerts visually.

In one embodiment, it may be advantageous to display the attitude information of the aircraft to the pilot if the aircraft is at an unsafe attitude. As such, in one embodiment, the alert device is a display, such as the display 52 of FIG. 4. In this embodiment, if either the composite roll angle is greater than the roll angle threshold value or the flight path angle is either greater than the upper flight path angle threshold or less than the lower flight path angle threshold, the display will activate and display the composite flight path and roll angles, thereby indicating to the user that the aircraft is at an unsafe attitude and providing the user with a view of the aircraft's attitude.

In some embodiments, it is advantageous to reduce the number of nuisance alerts by requiring that the aircraft remain at a bank angle that is at least as great as the roll angle threshold value or a flight path angle that is either greater than an upper flight angle threshold or less than a lower flight angle threshold for a given period of time before an alert is generated. This eliminates the generation of nuisance alarms in instances where the aircraft only momentarily exceeds the flight path and roll angle threshold values. With reference to FIGS. 5, 6, and 7 in this embodiment, the apparatus further includes delay devices, 66 and 68, respectively connected to the comparators, 60 and 62 and 56. The delay devices are configured to delay a preset time prior to providing an output to the alert device. As such, in this embodiment of the present invention, if the composite roll angle value is greater than the roll angle threshold value or the composite flight path angle is either greater than an upper flight angle threshold or less than a lower flight angle threshold, for greater than the present time defined by delay device, (see steps 280 and 380), the alert device is activated to provide an alert to the pilot of the aircraft. (See steps 290 and 390).

It must be understood that the delay time required before an alert will be generated is selectable and may be any value. For most embodiments, the delay is typically chosen from the range of 1 to 5 seconds, with 1 second being a preferable delay time.

Figure 1:
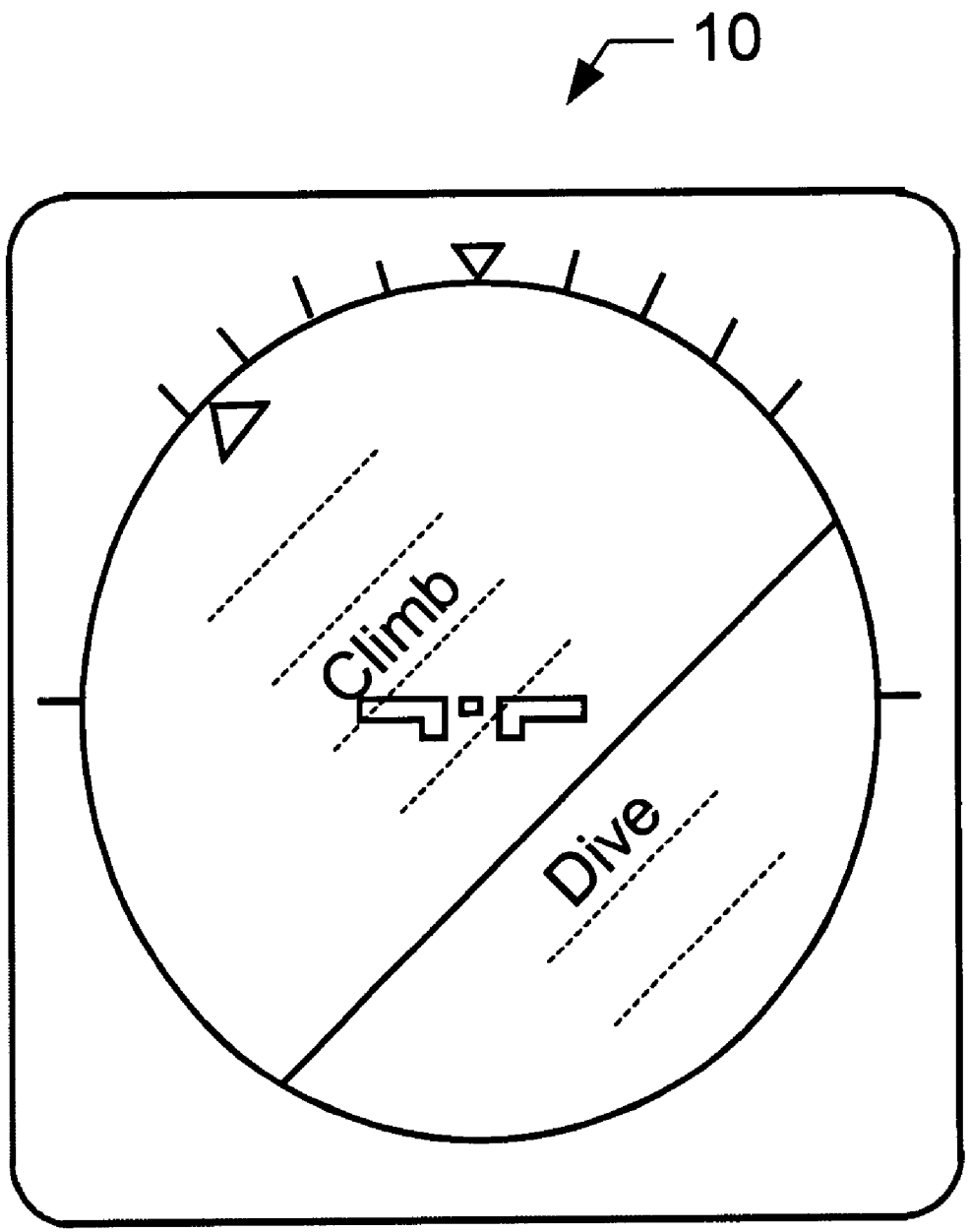
FIG. 1 is an illustration of a typical attitude indicator used in many aircraft.
Figure 8:
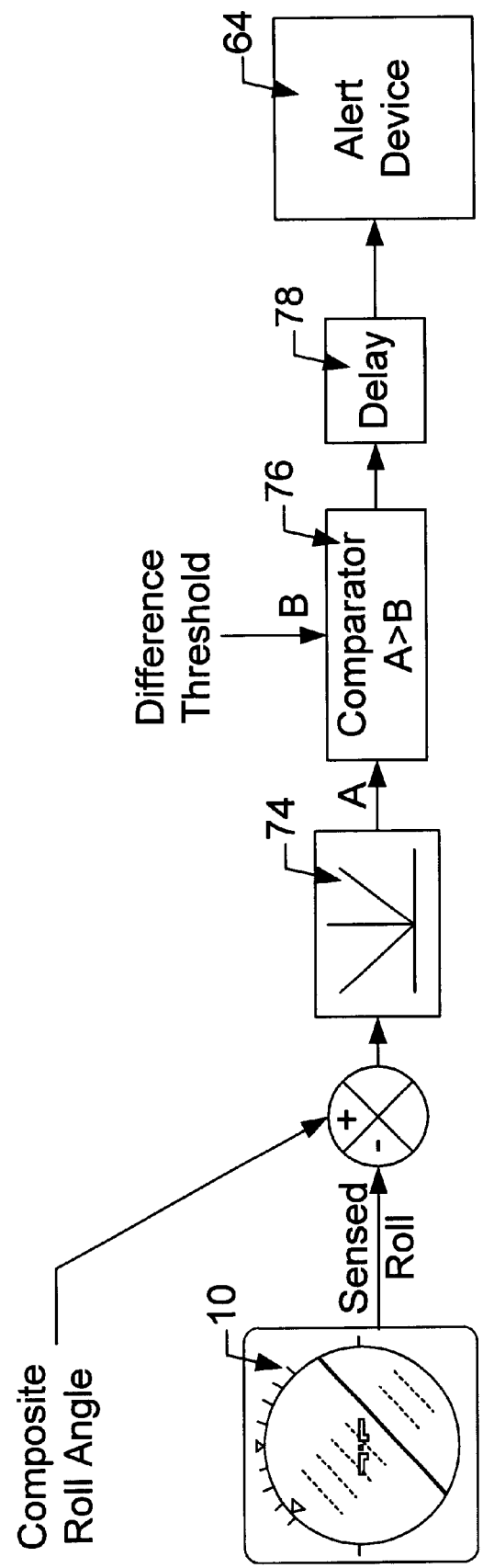
FIG. 8 is a block diagram of an apparatus for comparing the composite flight path and roll angle values to the sensed pitch and roll angle provided by an attitude indicator associated with the aircraft and providing alerts if there is an unacceptable difference between the composite and sensed values according to one embodiment of the present invention.

As discussed previously, the traditional attitude indicator used in most aircraft, (an example of which is shown in FIG. 1), may experience either an abrupt or gradual failure that may cause the pilot to place the aircraft in an unsafe attitude. In light of this, in some embodiments, it is advantageous to use the apparatus, methods, and computer program products of the present invention as a redundant system so that failures in the traditional attitude indicator can be recognized by the pilot. For example, with reference to FIG. 8, in one embodiment of the present invention, the apparatus further includes a second combiner 70 connected to the output of the combiner 24. The second combiner is also connected to an output of a traditional attitude indicator 72 associated with the aircraft, similar to the attitude indicator of FIG. 1. The apparatus of this embodiment also includes a signal condition device 74, comparator 76, and delay device 78 connected to the output of the second combiner.

Figure 9:
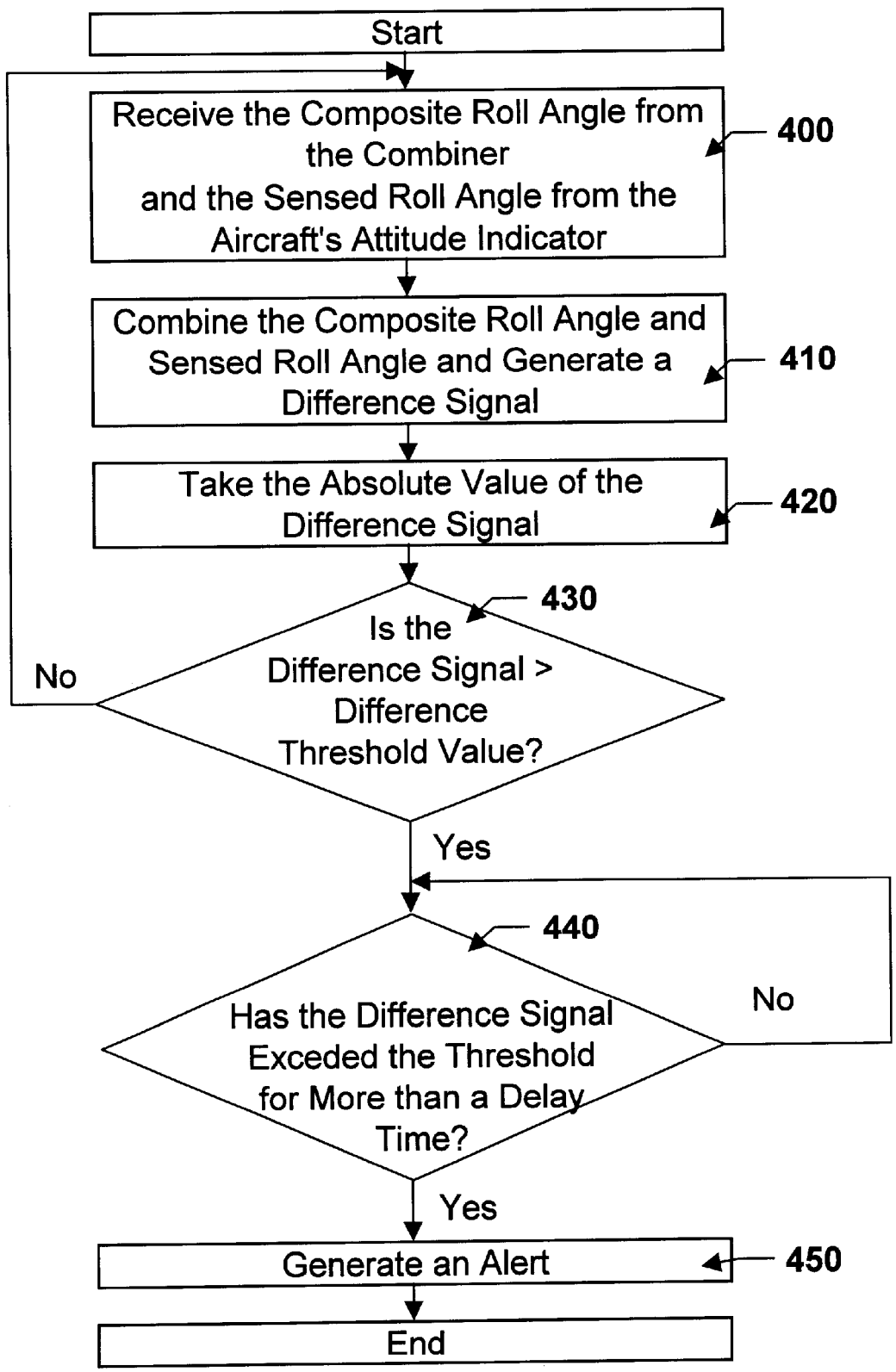
FIG. 9 is a block diagram of the operations performed to compare the composite flight path and roll angle values to the sensed pitch and roll angle provided by an attitude indicator associated with the aircraft and to provide alerts if there is an unacceptable difference between the composite and sensed values according to one embodiment of the present invention.

With reference to FIG. 9, in operation, the second combiner receives the composite roll angle from the combiner 24 and a sensed roll angle from the attitude indicator 72. (See step 400). The combiner combines the composite roll angle and sensed roll angle and generates a difference signal. (See step 410). The signal conditioning device takes the absolute value of the difference signal, (see step 420), and the comparator compares the difference signal to a difference angle threshold value. (See step 430). If the difference signal is at least as great as the difference angle threshold value, the alert device generates an indication to the pilot notifying the pilot that the attitude indicator associated with the aircraft may be incorrect. (See step 450). As such, the pilot will not use the traditional attitude indicator, but instead, will rely on the composite flight path and roll angle output by the apparatus, methods, and computer program products of the present invention.

In some embodiments, the delay device may be used to reduce the number of nuisance alarms to the pilot. Specifically, in some embodiments, the delay device may monitor the time that the difference signal is greater than the difference angle threshold, and only provide an alert if the different signal is greater than the difference signal for a sustained time. For example, in some embodiments, the delay device will not provide an alert unless the difference signal is greater than the difference signal threshold for greater than five seconds. (See step 440).

It must be noted that the above embodiment compares the composite roll angle to the angle indicated by the aircraft's attitude indicator. In some embodiment, the apparatus, methods, and computer program products of this embodiment may compare the computed flight path angle to the pitch angle indicated by the aircraft's attitude indicator.

Figure 10:
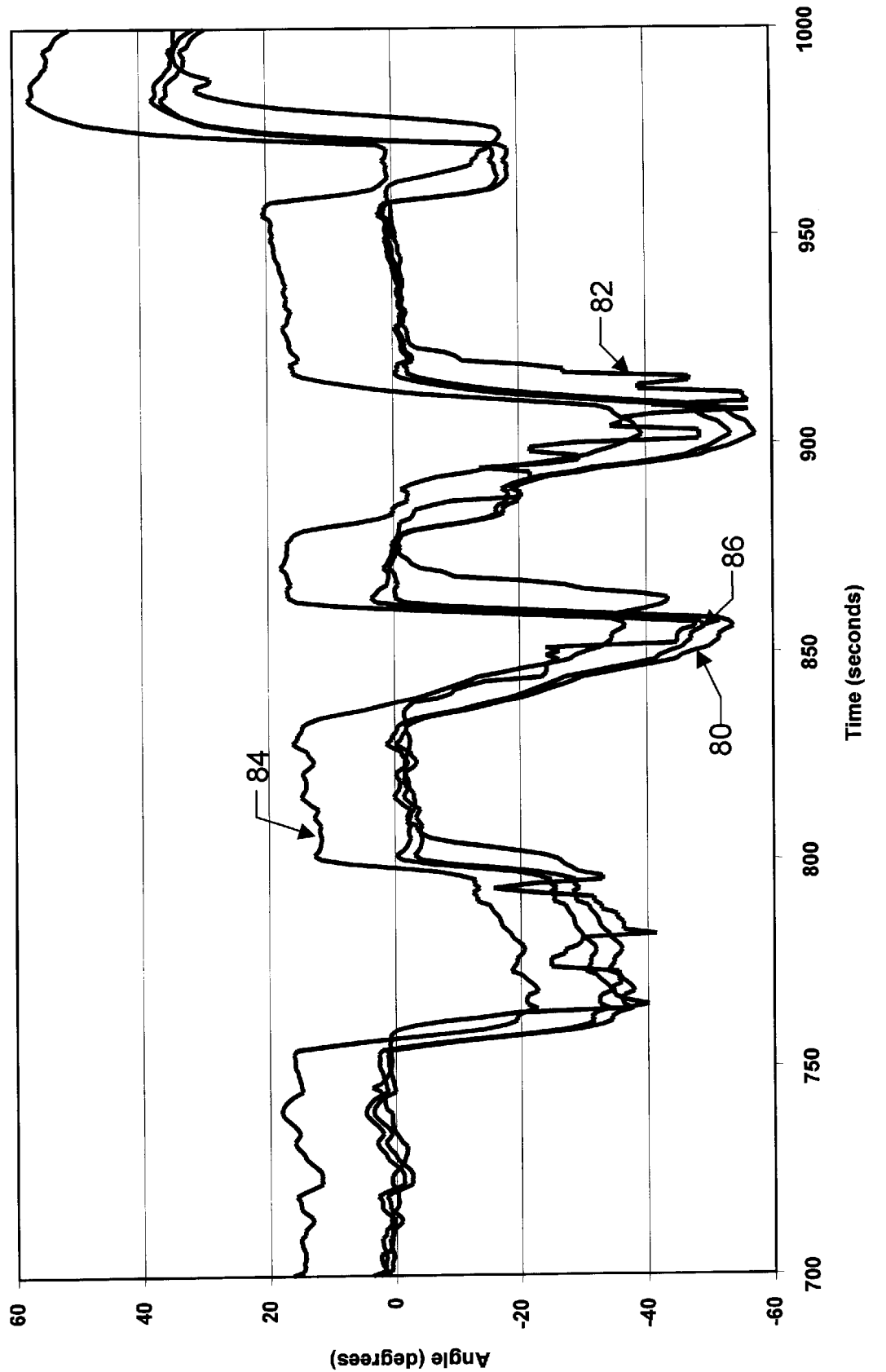
FIG. 10 is a graphic illustration of test results from the implementation of the apparatus of the present invention using aircraft flight data according to one embodiment of the present invention.

As detailed above, the apparatus, methods, and computer program products of the present invention provide an alternative attitude monitoring device for use in providing alerts to the pilot of an aircraft when the aircraft is in an unsafe attitude or as a redundant system to indicate to the pilot when the traditional attitude indicator associated with the aircraft is malfunctioning. FIG. 10 provides an initial set of test results generated by the apparatus, methods, and computer program products of the present invention. Specifically, FIG. 10 illustrates the indicated roll angle 80 from a traditional attitude indicator associated with the aircraft and the velocity vector roll 82 from a GPS during the flight of the aircraft. The sensed roll angle values 84 illustrated for the gyroscope are not real data but instead are simulated values that would be expected from the gyroscopes of the present invention if used in this flight. Further, the computed roll angle values 86 were computed using the apparatus, methods, and computer program products of the present invention. Importantly, FIG. 10 illustrates that although the angle values 84 provided by the low cost gyroscopes drift during stable flight and the angle values 82 provided by the GPS antenna lag somewhat from the actual movement of the aircraft, the composite roll angle value 86 consistently tracks the roll angle values 80 provided by the traditional attitude indicator of the aircraft. As such, the apparatus, methods, and computer program products of the present provide either an alternative or back-up systems for monitoring the attitude of an aircraft.

As discussed above, the gyroscopes of the present invention are positioned with respect to the aircraft to thereby provide a sensed roll and pitch of the aircraft. FIGS. 11A and 11B illustrate a packaging system 88 according to one embodiment of the present invention for packaging the low cost gyroscopes along with associated electronics. Specifically, FIG. 11A illustrates a package assembly 90 housing the first and second gyroscopes, 18 and 20. Connected to the gyroscopes is a signal processing card 92. With reference to FIG. 11B, the signal processing card includes filter and buffering circuits 94, an analog to digital converting device 96, and a processor 98. The processor provides the angle values generated by the gyroscopes to the first set of combiners, 22 and 24, via an RS-232 bus.

In addition to providing apparatus and methods, the present invention also provides computer program products for monitoring the attitude of an aircraft. The computer program products have a computer readable storage medium having computer readable program code means embodied in the medium. With reference to FIG. 2, the computer readable storage medium may be part of a memory device, not shown, and may implement the computer readable program code means to monitor the attitude of an aircraft as described in the various embodiments above.

The computer-readable program code means includes first computer instruction means for generating a calculated flight path angle and a calculated roll angle of the aircraft based on a velocity vector of the aircraft. The computer-readable program code means further includes second computer instruction means for combining the calculated flight path angle from generated by the first computer instruction means with a sensed pitch angle of the aircraft and the calculated roll angle from the first computer instruction means with a sensed roll angle of the aircraft to thereby provide a composite flight path angle and a composite roll angle representing the attitude of the aircraft.

In some embodiments, the computer-readable code means further includes third computer instruction means for comparing the composite roll angle with a roll angle threshold value and the composite flight path angle with upper and lower flight path angle thresholds. This embodiment further includes fourth computer instruction means for alerting the pilot of the aircraft if either the composite roll angle is greater than the roll angle threshold value or the composite flight path angle is either greater than the upper flight path angle threshold or less than the lower flight path angle threshold.

In another embodiment, computer-readable code means includes third computer instruction means for combining the composite roll angle with an indicated roll angle provided by an attitude indicator associated with the aircraft to thereby generate a difference signal and fourth computer instruction means for comparing the difference signal to a difference angle threshold value. If the difference signal is at least as great as the difference angle threshold value, fifth computer instruction means generates an indication to a user of the aircraft, such that the user is notified that the attitude indicator associated with the aircraft may be incorrect.

In this regard, FIGS. 2–9 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for monitoring the attitude of an aircraft comprising:

an input for receiving velocity values related to the velocity vector of the aircraft;

an output;

a generator in electrical communication with said input for determining a calculated flight path angle and a calculated roll angle of the aircraft based on a velocity vector of the aircraft; and a first combiner in electrical communication with said generator and said output, wherein said first combiner combines the calculated flight path angle from said generator with a sensed pitch angle of the aircraft and the calculated roll angle from said generator with a sensed roll angle of the aircraft and provides a composite flight path angle and a composite roll angle representing the attitude of the aircraft to said output.

2. An apparatus according to claim 1 further comprising first and second gyroscopes in electrical communication with said first combiner, wherein said gyroscopes are positioned with respect to the aircraft such that one of said gyroscopes senses the roll angle of the aircraft and the other of said gyroscopes senses the pitch angle of the aircraft.

3. An apparatus according to claim 2, wherein said first and second gyroscopes output respective signals representing the rate of change in the roll and pitch of the aircraft, wherein said apparatus further includes first and second integrators in respective electrical communication with said first and second gyroscopes, and wherein said first and second integrators integrate the respective outputs of the first and second gyroscopes to provide sensed roll and pitch angles of the aircraft to said first combiner.

4. An apparatus according to claim 2, wherein said first combiner further comprises a complimentary filter in electrical communication with the output of said generator and said first and second gyroscopes, wherein said complimentary filter operates as a low pass filter for the output of said generator and a high pass filter for the output of said first and second gyroscopes.

5. An apparatus according to claim 1 further comprising a navigation system in electrical communication with said input, wherein said navigation system provides an indication of the velocity of the aircraft in a north ($V_n$), east ($V_e$), and vertical ($V_z$) direction, and wherein said generator determines a calculated flight path angle and a calculated roll angle of the aircraft based on the velocity of the aircraft in a north ($V_n$), east ($V_e$), and vertical ($V_z$) direction.

6. An apparatus according to claim 5, wherein said generator determines a calculated flight path angle and a calculated roll angle of the aircraft based on the following equations:

$$\gamma = \tan^{-1} \frac{V_z}{\sqrt{V_n^2 + V_e^2}}$$

$$\psi = \tan^{-1} \frac{V_n}{V_e}$$

$$Roll_w = \tan^{-1} \frac{\frac{d\psi}{dt}\sqrt{V_n^2 + V_e^2}}{g}$$

where
- $\gamma$=calculated flight path angle of the aircraft;
- $\psi$=track angle of the aircraft;
- $Roll_w$=calculated roll angle of the aircraft;
- $V_n$=velocity of the aircraft in a north direction;
- $V_e$=velocity of the aircraft in an east direction;
- $V_z$=velocity of the aircraft in a vertical direction; and
- g=gravity.

7. An apparatus according to claim 5, wherein said navigation system is a global positioning system (GPS) receiver.

8. An apparatus according to claim 2 further comprising a converter and filter in electrical communication with the output of said first and second gyroscopes, wherein said converter converts signals output by said first and second gyroscopes into digital signals and said filter filters the signals output by said first and second gyroscopes.

9. An apparatus according to claim 1 further comprising:
  a comparator in electrical communication with said first combiner for comparing the composite roll angle generated by said first combiner to a threshold roll angle; and
  an alert device in electrical communication with said comparator, wherein said alert device generates an indication if the composite roll angle is at least as great as the threshold roll angle.

10. An apparatus according to claim 9 further comprising a display device in electrical communication with said comparator, wherein said display device displays the composite flight path angle and composite roll angle indicating the attitude of the aircraft, if the composite roll angle is at least as great as the threshold roll angle.

11. An apparatus according to claim 1 further comprising:
  a comparator in electrical communication with said first combiner for comparing the composite flight path angle generated by said first combiner to an upper threshold flight path angle; and
  an alert device in electrical communication with said comparator, wherein said alert device generates an indication if the composite flight path angle is at least as great as the upper threshold flight path angle.

12. An apparatus according to claim 11, wherein said comparator compares the composite flight path angle generated by said first combiner to a lower threshold flight path angle, and wherein said alert device generates an indication if the composite flight path angle is no more than the lower threshold flight path angle.

13. An apparatus according to claim 12 further comprising a display device in electrical communication with said comparator, wherein said display device displays the composite flight path angle and composite roll angle indicating the attitude of the aircraft, if the composite flight path angle is either at least as great as the upper threshold flight path angle or no more than the lower threshold flight path angle.

14. An apparatus according to claim 1 further comprising a display device in electrical communication with said first combiner, wherein said display device displays the composite flight path angle and composite roll angle from said first combiner indicating the attitude of the aircraft.

15. An apparatus according to claim 1 further comprising:
  a second combiner in electrical communication with said first combiner, wherein said second combiner combines the composite roll angle from said first combiner with an indicated roll angle provided by an attitude indicator associated with the aircraft and generates a difference signal;
  a comparator in electrical communication with said second combiner, wherein said comparator compares the difference signal to a difference angle threshold value; and
  an alert device in electrical communication with said comparator, wherein said alert device generates an indication to a user of the aircraft if the difference signal is at least as great as the difference angle threshold value, such that the user is notified that the attitude indicator associated with the aircraft may be incorrect.

16. An apparatus according to claim 1 further comprising:
  a second combiner in electrical communication with said first combiner, wherein said second combiner combines the composite flight path angle from said first combiner with an indicated pitch angle provided by an attitude indicator associated with the aircraft and generates a difference signal;
  a comparator in electrical communication with said second combiner, wherein said comparator compares the difference signal to a difference angle threshold value; and
  an alert device in electrical communication with said comparator, wherein said alert device generates an indication to a user of the aircraft if the difference signal is at least as great as the difference angle threshold value, such that the user is notified that the attitude indicator associated with the aircraft may be incorrect.

17. An apparatus for monitoring the attitude of an aircraft comprising:
- a generator for determining a calculated flight path angle and a calculated roll angle of the aircraft based on a velocity vector of the aircraft; and
- a first combiner in electrical communication with said generator, wherein said first combiner combines the calculated flight path angle from said generator with a sensed pitch angle of the aircraft and the calculated roll angle from said generator with a sensed roll angle of the aircraft to thereby provide a composite flight path angle and a composite roll angle representing the attitude of the aircraft.

18. An apparatus according to claim 17 further comprising first and second gyroscopes positioned with respect to the aircraft such that one of said gyroscopes senses the roll angle of the aircraft and the other of said gyroscopes senses the pitch angle of the aircraft.

19. An apparatus according to claim 18, wherein said first and second gyroscopes output respective signals representing the rate of change in the roll and pitch of the aircraft, wherein said apparatus further includes first and second integrators in respective electrical communication with said first and second gyroscopes, and wherein said first and second integrators integrate the respective outputs of the first and second gyroscopes to provide sensed roll and pitch angles of the aircraft.

20. An apparatus according to claim 18, wherein said first combiner further comprises a complimentary filter in electrical communication with the output of said generator and said first and second gyroscopes, wherein said complimentary filter operates as a low pass filter for the output of said generator and a high pass filter for the output of said first and second gyroscopes.

21. An apparatus according to claim 17 further comprising a navigation system in electrical communication with said generator, wherein said navigation system provides an indication of the velocity of the aircraft in a north ($V_n$), east ($V_e$), and vertical ($V_z$) direction, and wherein said generator determines a calculated flight path angle and a calculated roll angle of the aircraft based on the velocity of the aircraft in a north ($V_n$), east ($V_e$), and vertical ($V_z$) direction.

22. An apparatus according to claim 21, wherein said generator determines a calculated flight path angle and a calculated roll angle of the aircraft based on the following equations:

$$\gamma = \tan^{-1} \frac{V_z}{\sqrt{V_n^2 + V_e^2}}$$

$$\psi = \tan^{-1} \frac{V_n}{V_e}$$

$$Roll_w = \tan^{-1} \frac{\frac{d\psi}{dt}\sqrt{V_n^2 + V_e^2}}{g}$$

where
- $\gamma$=calculated flight path angle of the aircraft;
- $\psi$=track angle of the aircraft;
- $Roll_w$=calculated roll angle of the aircraft;
- $V_n$=velocity of the aircraft in a north direction;
- $V_e$=velocity of the aircraft in an east direction;
- $V_z$=velocity of the aircraft in a vertical direction; and
- g=gravity.

23. An apparatus according to claim 21, wherein said navigation system is a global positioning system (GPS) receiver.

24. An apparatus according to claim 18 further comprising a converter and filter in electrical communication with the output of said first and second gyroscopes, wherein said converter converts signals output by said first and second gyroscopes into digital signals and said filter filters the signals output by said first and second gyroscopes.

25. An apparatus according to claim 17 further comprising:
- a comparator in electrical communication with said first combiner for comparing the composite roll angle generated by said first combiner to a threshold roll angle; and
- an alert device in electrical communication with said comparator, wherein said alert device generates an indication if the composite roll angle is at least as great as the threshold roll angle.

26. An apparatus according to claim 25 further comprising a display device in electrical communication with said comparator, wherein said display device displays the composite flight path angle and composite roll angle indicating the attitude of the aircraft, if the composite roll angle is at least as great as the threshold roll angle.

27. An apparatus according to claim 17 further comprising:
- a comparator in electrical communication with said first combiner for comparing the composite flight path angle generated by said first combiner to an upper threshold flight path angle; and
- an alert device in electrical communication with said comparator, wherein said alert device generates an indication if the composite flight path angle is at least as great as the upper threshold flight path angle.

28. An apparatus according to claim 27, wherein said comparator compares the composite flight path angle generated by said first combiner to a lower threshold flight path angle, and wherein said alert device generates an indication if the composite flight path angle is no more than the lower threshold flight path angle.

29. An apparatus according to claim 28 further comprising a display device in electrical communication with said comparator, wherein said display device displays the composite flight path angle and composite roll angle indicating the attitude of the aircraft, if the composite flight path angle is either at least as great as the upper threshold flight path angle or no more than the lower threshold flight path angle.

30. An apparatus according to claim 17 further comprising a display device in electrical communication with said first combiner, wherein said display device displays the composite flight path angle and composite roll angle from said first combiner indicating the attitude of the aircraft.

31. An apparatus according to claim 17 further comprising:
- a second combiner in electrical communication with said first combiner, wherein said second combiner combines the composite roll angle from said first combiner with an indicated roll angle provided by an attitude indicator associated with the aircraft and generates a difference signal;
- a comparator in electrical communication with said second combiner, wherein said comparator compares the difference signal to a difference angle threshold value; and
- an alert device in electrical communication with said comparator, wherein said alert device generates an indication to a user of the aircraft if the difference signal is at least as great as the difference angle threshold value, such that the user is notified that the attitude indicator associated with the aircraft may be incorrect.

32. An apparatus according to claim 17 further comprising:
a second combiner in electrical communication with said first combiner, wherein said second combiner combines the composite flight path angle from said first combiner with an indicated pitch angle provided by an attitude indicator associated with the aircraft and generates a difference signal;
a comparator in electrical communication with said second combiner, wherein said comparator compares the difference signal to a difference angle threshold value; and
an alert device in electrical communication with said comparator, wherein said alert device generates an indication to a user of the aircraft if the difference signal is at least as great as the difference angle threshold value, such that the user is notified that the attitude indicator associated with the aircraft may be incorrect.

33. A method for monitoring the attitude of an aircraft comprising the steps of:
generating a calculated flight path angle and a calculated roll angle of the aircraft based on a velocity vector of the aircraft; and
combining the calculated flight path angle from said generating step with a sensed pitch angle of the aircraft and the calculated roll angle from said generating step with a sensed roll angle of the aircraft to thereby provide a composite flight path angle and a composite roll angle representing the attitude of the aircraft.

34. A method according to claim 33 further comprising the step of sensing the roll angle of the aircraft and the pitch angle of the aircraft.

35. A method according to claim 34, wherein said sensing step comprises receiving respective signals representing the rate of change in the roll and pitch of the aircraft, wherein said method further comprises the step of integrating the respective received signals to provide sensed roll and pitch angles of the aircraft.

36. A method according to claim 34 further comprising the steps of
converting the roll angle of the aircraft and the pitch angle of the aircraft sensed in said sensing step into digital signals; and
filtering the roll angle of the aircraft and the pitch angle of the aircraft sensed in said sensing step.

37. A method according to claim 34, wherein said method further comprises the steps of:
low pass filtering the calculated flight path angle and calculated roll angle of the aircraft generated by said generating step; and
high pass filtering the roll angle of the aircraft and the pitch angle of the aircraft sensed in said sensing step.

38. A method according to claim 33 further comprising the step of providing an indication of the velocity of the aircraft in a north ($V_n$), east ($V_e$), and vertical ($V_z$) direction, and wherein said generating step generates a calculated flight path angle and a calculated roll angle of the aircraft based on the velocity of the aircraft in a north ($V_n$), east ($V_e$), and vertical ($V_z$) direction.

39. A method according to claim 38, wherein said generating step generates a calculated flight path angle and a calculated roll angle of the aircraft based on the following equations:

$$\gamma = \tan^{-1} \frac{V_z}{\sqrt{V_n^2 + V_e^2}}$$

$$\psi = \tan^{-1} \frac{V_n}{V_e}$$

$$Roll_w = \tan^{-1} \frac{\frac{d\psi}{dt}\sqrt{V_n^2 + V_e^2}}{g}$$

where
$\gamma$=calculated flight path angle of the aircraft;
$\psi$=track angle of the aircraft;
$Roll_w$=calculated roll angle of the aircraft;
$V_n$=velocity of the aircraft in a north direction;
$V_e$=velocity of the aircraft in an east direction;
$V_z$=velocity of the aircraft in a vertical direction; and
g=gravity.

40. A method according to claim 33 further comprising the steps of:
comparing the composite roll angle generated in said combining step to a threshold roll angle; and
generating an indication if the composite roll angle is at least as great as the threshold roll angle.

41. A method according to claim 40 further comprising the step of displaying the composite flight path angle and composite roll angle indicating the attitude of the aircraft, if the composite roll angle is at least as great as the threshold roll angle.

42. A method according to claim 33 further comprising the steps of:
comparing the composite flight path angle generated in said combining step to an upper threshold flight path angle; and
generating an indication if the composite flight path angle is at least as great as the upper threshold flight path angle.

43. A method according to claim 42, wherein said comparing step compares the composite flight path angle generated in said combining step to a lower threshold flight path angle, and wherein said generating an indication step generates an indication if the composite flight path angle is no more than the lower threshold flight path angle.

44. A method according to claim 43 further comprising the step of displaying the composite flight path angle and composite roll angle indicating the attitude of the aircraft, if the composite flight path angle is either at least as great as the upper threshold flight path angle or no more than the lower threshold flight path angle.

45. A method according to claim 33 further comprising the step of displaying the composite flight path angle and composite roll angle from said combining step indicating the attitude of the aircraft.

46. A method according to claim 33 further comprising:
combining the composite roll angle with an indicated roll angle provided by an attitude indicator associated with the aircraft to thereby generate a difference signal;
comparing the difference signal to a difference angle threshold value; and
generating an indication to a user of the aircraft if the difference signal is at least as great as the difference angle threshold value, such that the user is notified that the attitude indicator associated with the aircraft may be incorrect.

47. A method according to claim 33 further comprising:
  combining the composite flight path angle with an indicated pitch angle provided by an attitude indicator associated with the aircraft to thereby generate a difference signal;
  comparing the difference signal to a difference angle threshold value; and
  generating an indication to a user of the aircraft if the difference signal is at least as great as the difference angle threshold value, such that the user is notified that the attitude indicator associated with the aircraft may be incorrect.

48. A computer program product for monitoring the attitude of an aircraft, wherein the computer program product comprises:
  a computer-readable storage medium having computer readable program code means embodied in said medium, said computer-readable program code means comprising:
    first computer instruction means for generating a calculated flight path angle and a calculated roll angle of the aircraft based on a velocity vector of the aircraft; and
    second computer instruction means for combining the calculated flight path angle from said first computer instruction means with a sensed pitch angle of the aircraft and the calculated roll angle from said first computer instruction means with a sensed roll angle of the aircraft to thereby provide a composite flight path angle and a composite roll angle representing the attitude of the aircraft.

49. A computer program product according to claim 48, wherein said computer-readable program code means further comprises third computer instruction means for receiving a sensed roll angle of the aircraft and a sensed pitch angle of the aircraft.

50. A computer program product according to claim 49, wherein said third computer instruction means comprises receiving respective signals representing the rate of change in the roll and pitch of the aircraft, wherein said computer-readable program code means further comprises fourth computer instruction means for integrating the respective received signals to provide sensed roll and pitch angles of the aircraft.

51. A computer program product according to claim 49, wherein said computer-readable program code means further comprises:
  fourth computer instruction means for converting the sensed roll angle of the aircraft and the sensed pitch angle of the aircraft received by said third computer instruction means into digital signals; and
  fifth computer instruction means for filtering the sensed roll angle of the aircraft and the sensed pitch angle of the aircraft received by said third computer instruction means.

52. A computer program product according to claim 49, wherein said computer-readable program code means further comprises:
  fourth computer instruction means for low pass filtering the calculated flight path angle and calculated roll angle of the aircraft generated by said first computer instruction means; and
  fifth computer instruction means for high pass filtering the sensed roll angle of the aircraft and the sensed pitch angle of the aircraft received by said third computer instruction means.

53. A computer program product according to claim 48 further comprising third computer instruction means for providing an indication of the velocity of the aircraft in a north ($V_n$), east ($V_e$), and vertical ($V_z$) direction, and wherein said first computer instruction means generates a calculated flight path angle and a calculated roll angle of the aircraft based on the velocity of the aircraft in a north ($V_n$), east ($V_e$), and vertical ($V_z$) direction.

54. A computer program product according to claim 53, wherein said first computer instruction means generates a calculated flight path angle and a calculated roll angle of the aircraft based on the following equations:

$$\gamma = \tan^{-1} \frac{V_z}{\sqrt{V_n^2 + V_e^2}}$$

$$\psi = \tan^{-1} \frac{V_n}{V_e}$$

$$Roll_w = \tan^{-1} \frac{\frac{d\psi}{dt}\sqrt{V_n^2 + V_e^2}}{g}$$

where
  $\gamma$=calculated flight path angle of the aircraft;
  $\psi$=track angle of the aircraft;
  $Roll_w$=calculated roll angle of the aircraft;
  $V_n$=velocity of the aircraft in a north direction;
  $V_e$=velocity of the aircraft in an east direction;
  $V_z$=velocity of the aircraft in a vertical direction; and
  g=gravity.

55. A computer program product according to claim 48, wherein said computer-readable program code means further comprises:
  third computer instruction means for comparing the composite roll angle generated by said second computer instruction means to a threshold roll angle; and
  fourth computer instruction means for generating an indication if the composite roll angle is at least as great as the threshold roll angle.

56. A computer program product according to claim 55, wherein said computer-readable program code means further comprises fifth computer instruction means for displaying the composite flight path angle and composite roll angle indicating the attitude of the aircraft, if the composite roll angle is at least as great as the threshold roll angle.

57. A computer program product according to claim 48, wherein said computer-readable program code means further comprises:
  third computer instruction means for comparing the composite flight path angle generated by said second computer instruction means to an upper threshold flight path angle; and
  fourth computer instruction means for generating an indication if the composite flight path angle is at least as great as the upper threshold flight path angle.

58. A computer program product according to claim 57, wherein said third computer instruction means compares the composite flight path angle generated by said second computer instruction means to a lower threshold flight path angle, and wherein said fourth computer instruction means generates an indication if the composite flight path angle is no more than the lower threshold flight path angle.

59. A computer program product according to claim 58, wherein said computer-readable program code means further comprises third computer instruction means for displaying the composite flight path angle and composite roll angle indicating the attitude of the aircraft, if the composite flight path angle is either at least as great as the upper threshold flight path angle or no more than the lower threshold flight path angle.

60. A computer program product according to claim 48, wherein said computer-readable program code means further comprises third computer instruction means for displaying the composite flight path angle and composite roll angle generated by said second computer instruction means thereby indicating the attitude of the aircraft.

61. A computer program product according to claim 48, wherein said computer-readable program code means further comprises:
   third computer instruction means for combining the composite roll angle with an indicated roll angle provided by an attitude indicator associated with the aircraft to thereby generate a difference signal;
   fourth computer instruction means for comparing the difference signal to a difference angle threshold value; and
   fifth computer instruction means for generating an indication to a user of the aircraft if the difference signal is at least as great as the difference angle threshold value, such that the user is notified that the attitude indicator associated with the aircraft may be incorrect.

62. A computer program product according to claim 48, wherein said computer-readable program code means further comprises:
   third computer instruction means for combining the composite flight path angle with an indicated pitch angle provided by an attitude indicator associated with the aircraft to thereby generate a difference signal;
   fourth computer instruction means for comparing the difference signal to a difference angle threshold value; and
   fifth computer instruction means for generating an indication to a user of the aircraft if the difference signal is at least as great as the difference angle threshold value, such that the user is notified that the attitude indicator associated with the aircraft may be incorrect.

* * * * *